United States Patent
Eckerle

(10) Patent No.: US 8,164,296 B2
(45) Date of Patent: Apr. 24, 2012

(54) METHOD AND APPARATUS FOR DETERMINING A FIELD CURRENT IN BRUSHLESS ELECTRICAL MACHINES

(75) Inventor: John Eckerle, Basel (CH)

(73) Assignee: ABB Schweiz AG, Baden (CH)

( * ) Notice: Subject to any disclaimer, the term of this patent is extended or adjusted under 35 U.S.C. 154(b) by 231 days.

(21) Appl. No.: 12/721,087

(22) Filed: Mar. 10, 2010

(65) Prior Publication Data
US 2010/0219786 A1 Sep. 2, 2010

Related U.S. Application Data

(63) Continuation of application No. PCT/EP2008/060746, filed on Aug. 15, 2008.

(60) Provisional application No. 60/971,406, filed on Sep. 11, 2007.

(51) Int. Cl.
H02P 3/18 (2006.01)
H02P 6/00 (2006.01)

(52) U.S. Cl. ........ 318/716; 318/718; 318/140; 318/153; 318/158; 322/28; 322/29; 322/46

(58) Field of Classification Search .................. 318/716, 318/718, 140, 153, 158; 322/28, 29, 46
See application file for complete search history.

(56) References Cited

U.S. PATENT DOCUMENTS

| | | | | |
|---|---|---|---|---|
| 4,106,069 | A | * | 8/1978 | Trautner et al. .................. 361/30 |
| 5,493,200 | A | * | 2/1996 | Rozman et al. .................. 322/10 |
| 5,512,811 | A | * | 4/1996 | Latos et al. ...................... 322/10 |
| 5,920,162 | A | | 7/1999 | Hanson et al. |
| 7,034,499 | B2 | * | 4/2006 | Kerlin et al. .................. 318/749 |

FOREIGN PATENT DOCUMENTS

| | | |
|---|---|---|
| DE | 31 20 797 A1 | 12/1982 |
| JP | 4-058799 A | 2/1992 |
| WO | WO 2004/082105 A | 9/2004 |

OTHER PUBLICATIONS

International Search Report (PCT/ISA/210) for PCT/EP2008/060746 mailed Oct. 14, 2008.
Written Opinion (PCT/ISA/237) for PCT/EP2008/060746 mailed Oct. 14, 2008.

* cited by examiner

*Primary Examiner* — Walter Benson
*Assistant Examiner* — Erick Glass
(74) *Attorney, Agent, or Firm* — Buchanan Ingersoll & Rooney PC

(57) ABSTRACT

A method and an apparatus are described for determining a field current through a field winding in an electrical machine with a stator and a rotor. The electrical machine includes a field-circuit transformer to produce, by induction of an electrical current on the rotor side, field current with which a field winding is energized in order to generate an excitation magnetic field. The method includes driving the primary side of the field-circuit transformer to produce a field current in the rotor, which is derived from the current induced on the secondary side in the field-circuit transformer; measuring one or more phase currents in one or more primary-side phases of the field-circuit transformer; determining a maximum value depending on the one or more measured phase currents; determining the field current through the field winding depending on the determined maximum value.

10 Claims, 3 Drawing Sheets

US 8,164,296 B2

METHOD AND APPARATUS FOR DETERMINING A FIELD CURRENT IN BRUSHLESS ELECTRICAL MACHINES

RELATED APPLICATION

This application is a continuation application under 35 U.S.C. §120 of PCT/EP2008/060746 filed as an International Application on Aug. 15, 2008 designating the U.S., which claims the benefit under 35 U.S.C. §119 of U.S. Provisional Patent No. 60/971,406 filed on Sep. 11, 2007, the entire contents of which are hereby incorporated by reference in their entireties.

FIELD

The disclosure relates to brushless electrical machines with field windings and methods for operating such machines.

BACKGROUND INFORMATION

Brushless electrical machines such as, for example, synchronous motors can have, in addition to a stator winding, a field winding arranged on the rotor. The field winding is supplied with electrical energy to generate an excitation magnetic field. The electrical energy is provided to the field winding by virtue of transformer coupling between one or more primary coils on the stator and one or more secondary coils on the rotor. The field-circuit transformer formed from primary coils and secondary coils can be arranged in offset fashion, for example axially, on an axis of a rotary electrical machine. In other cases, the stator winding can be used as the primary coil of the field-circuit transformer.

The field-circuit transformer includes a stator field winding as primary coil and a rotor field winding as secondary coil. The rotor field winding can be connected to the field winding via a diode rectifier bridge. As a result, the field winding is provided with a direct electrical current, the field current, which generates the excitation magnetic field.

For defined operation of such an electrical machine, for example for setting a determined torque, however, the field current through the field winding can be determined and regulated to determine the intensity of the magnetic field brought about by the field winding. Since the electrical machine does not have a tap for currents on the rotor side and does not permit reliable current measurement in any other way, the field current is estimated by measurements of electrical variables on the stator side.

Previous estimation methods have been based on a measurement of two phase currents and of two phase-to-phase output voltages of an actuating element with a high time resolution, which is converted in a complex manner. The output voltage of the actuating element is additionally a non-sinusoidal voltage, as a result of which the computation complexity in the evaluation for the determination of the field current can be high.

SUMMARY

A method is disclosed for determining a field current through a field winding in an electrical machine with a stator and a rotor, where the electrical machine has a field-circuit transformer to produce, by induction of an electrical current on a rotor side, field current with which the field winding is energized to generate an excitation magnetic field, the method comprising: driving a primary of the field-circuit transformer to produce a field current in the rotor which is derived from current induced on a secondary of the field-circuit transformer; measuring at least one phase current in at least one primary-side phase of the field-circuit transformer; determining a maximum value of the at least one measured phase current; and determining the field current through the field winding based on the maximum value determined.

An apparatus is also disclosed for determining a field current through a field winding in an electrical machine having a stator, a rotor, and a field-circuit transformer for producing, by induction of an electrical current on a rotor side, the field current with which the field winding is energized to generate an excitation magnetic field, the apparatus comprising: a device for driving a primary of a field-circuit transformer to produce a field current in a rotor which is derived from current induced on a secondary of the field-circuit transformer; a current detection unit for measuring at least one phase current in at least one primary-side phase of the field-circuit transformer; a maximum current determination unit for determining a maximum value of the at least one measured phase current; and a motor control unit for determining the field current through the field winding based on the maximum value determined.

A motor system is also disclosed, comprising an electrical machine with a stator, and a rotor which has a field winding; a field-circuit transformer for producing by induction of an electrical current on a rotor side, field current with which a field winding generates an excitation magnetic field; a device for driving a primary of the field-circuit transformer to produce the field current in the rotor which is derived from current induced on a secondary of the field-circuit transformer; a current detection unit for measuring at least one phase current in at least one primary-side phase of the field-circuit transformer; a maximum current determination unit for determining a maximum value of the at least measured phase current; and a motor control unit for determining the field current through the field winding based on the maximum value determined.

BRIEF DESCRIPTION OF THE DRAWINGS

Exemplary embodiments of the disclosure will be explained in more detail below with reference to the attached drawings, in which.

DETAILED DESCRIPTION

Figure 1:
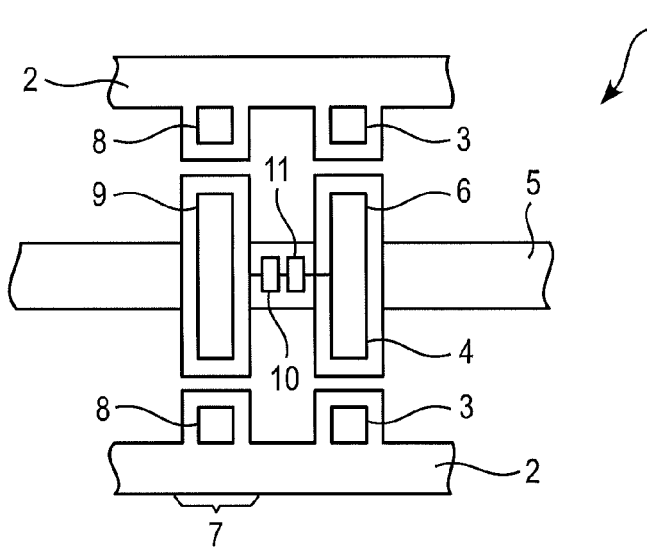
FIG. 1 shows a cross-sectional illustration of an exemplary electrical machine with a field-circuit transformer.

A method and an apparatus are disclosed with which a field current can be determined in a precise and reliable manner using measurement of an electrical variable measured on the stator side.

In accordance with a first exemplary embodiment, a method is disclosed for determining a field current through a field winding in an electrical machine with a stator and a rotor. The electrical machine includes a field-circuit transformer in order to bring about, by induction of an electrical current on the rotor side, the field current with which a field winding is energized in order to generate an excitation magnetic field. An exemplary method includes:

primary-side driving of the field-circuit transformer in order to bring about a field current in the rotor, which is derived from the current induced on the secondary side in the field-circuit transformer;

measurement of one or more primary-side phase currents in the field-circuit transformer;

determination of a maximum value depending on the one or more measured phase currents; and determination of the field current through the field winding depending on the maximum value determined.

An exemplary method includes calculating the field current with the aid of a simple current divider calculation depending on a maximum value of a phase current on the stator side. The measurement of the maximum value of the phase current can be carried out easily, while determination of the field current by virtue of a measurement of stator-side phase currents and phase-to-phase voltages at a high sampling frequency, involves a complex calculation to determine switch-on times of diodes of a rectifier used in the rotor.

The method for determining the field current is, for example, based on an assumption that, at a specific point in time, the current is passing through two of the coils of the rotor field winding, with the result that the magnetizing inductance can be assumed for each of the coils of the rotor field winding in which the phase current flowing on the stator side brings about a current flow by virtue of the transformer coupling. The field current flowing through the field winding can therefore be determined as a partial current of the entire transformer-induced, secondary-side current in a current divider. The current divider has a first current path through the two magnetizing inductances of the two active coils of the rotor field winding and a second current path through the field winding.

Furthermore, the determination of the field current can be carried out depending on a reduction factor of the field-circuit transformer, which corresponds to the turns ratio of a primary-side coil and a secondary-side coil, depending on a predetermined correction factor, which can be determined empirically, for example, depending on the rotation speed of the electrical machine and depending on a ratio of a magnetizing inductance of the field-circuit transformer and a sum of the magnetizing inductance and the impedance of the field winding.

In accordance with an exemplary embodiment, a plurality of phase currents can be measured in primary-side phases, the maximum value being determined by averaging the maximum values of the plurality of phase currents.

In accordance with an alternative exemplary embodiment, a plurality of phase currents can be measured in primary-side phases, the maximum value being determined by rectification of currents and voltages derived from the plurality of phase currents in a bridge rectifier and by determination of the maximum value depending on the rectified current and the rectified voltage, respectively.

In accordance with a further aspect, an exemplary apparatus for determining a field current through a field winding in an electrical machine with a stator and a rotor is disclosed, wherein the electrical machine includes a field-circuit transformer in order to bring about, by induction of an electrical current on the rotor side, the field current with which a field winding is energized in order to generate an excitation magnetic field. An exemplary apparatus can include:

a current detection unit for detecting one or more phase currents in one or more primary-side phases of the field-circuit transformer;

a maximum current determination unit for determining a maximum value depending on the one or more measured phase currents; and a motor control unit for determining the field current through the field winding depending on the maximum value determined.

Furthermore, a transformer control unit can be provided in order to carry out the primary-side driving of the field-circuit transformer, the transformer unit setting the phase currents to, for example, be constant or to be predetermined by the motor control unit.

In accordance with a further aspect, an exemplary motor system is provided. An exemplary motor system can include:

a field current determining device as disclosed herein; and an electrical machine with a stator, a rotor, a field winding, and a field-circuit transformer in order to bring about, by induction of an electrical current on the rotor side, the field current with which a field winding generates the excitation magnetic field.

Furthermore, the electrical machine can have a diode bridge rectifier for rectifying the transformer currents generated on the secondary side in the field-circuit transformer.

FIG. 1 illustrates a cross-sectional illustration of an exemplary rotary electrical machine 1, for example an electric motor. The electrical machine 1 includes a stator 2 with a stator winding 3 and a rotor 4 (for example in the case of a rotary electric motor), which is fitted on a shaft 5. The rotor 4 includes a rotor field winding 6 in order to generate an excitation magnetic field. The electrical machine can be operated as an electric motor by driving the stator winding 3.

An exemplary field-circuit transformer 7 is arranged at a position on the shaft 5 which is adjacent in the axial direction. The field-circuit transformer 7 has a stator field winding 8 on the stator 2 or at a position which is fixed with respect to the rotor 4 and a rotor field winding 9, which is arranged on the rotatable shaft 5.

The stator winding 3, the rotor winding 6, the stator field winding 8 and the rotor field winding 9 can each have coils, whose poles can be aligned in the radial direction. The individual coils of the stator field winding 8 can be driven in such a way that a circumferential alternating field results depending on a rotation speed of the shaft 5, with the result that current is induced alternately in the coils of the rotor field winding 9.

The field current induced in the coils of the rotor field winding 9 can be rectified in a diode bridge rectifier 10. The downstream diode protection circuit 11, which is formed from a capacitance and a resistance, can serve a purpose of protecting the diode bridge rectifier 10. The rectified field current $I_{DC}$ flows through the field winding 6 of the rotor 4 in order to generate the excitation magnetic field.

Figure 2:
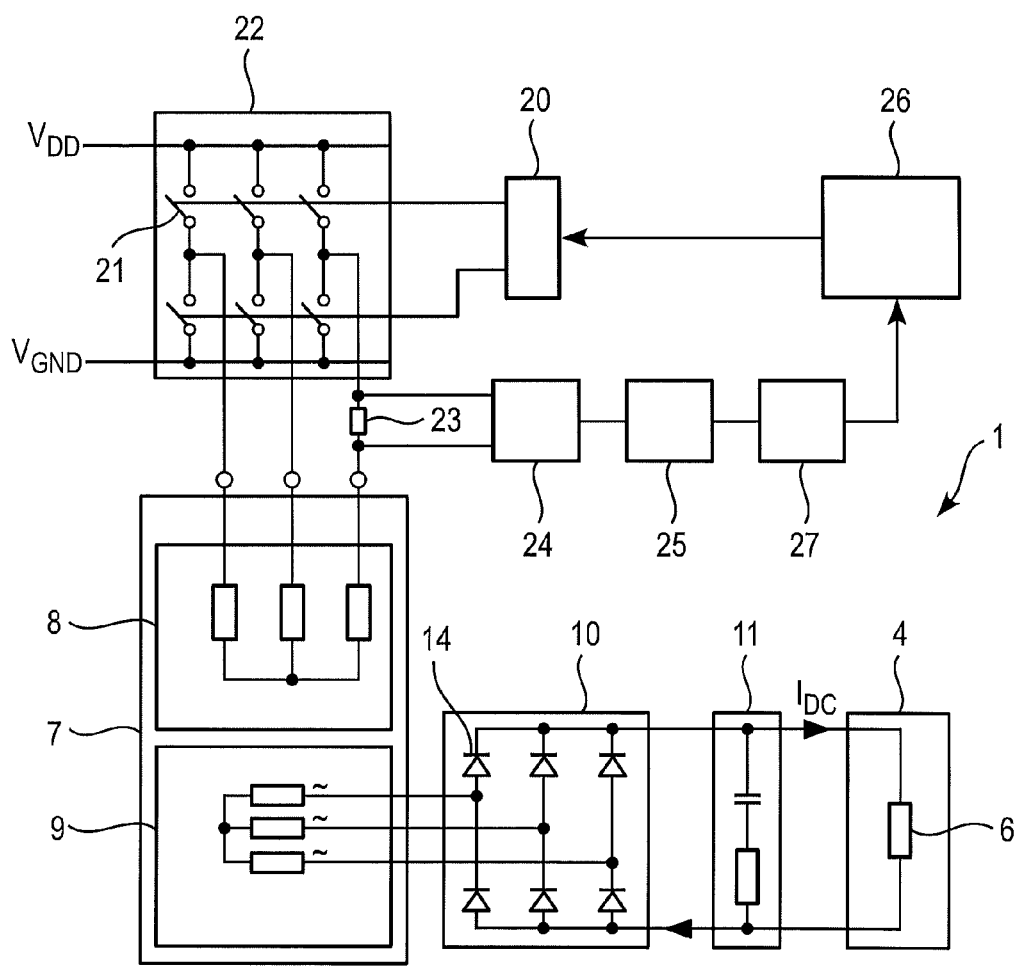
FIG. 2 shows a circuit diagram for illustrating an exemplary electronic circuit of the electrical machine shown in FIG. 1.

FIG. 2 illustrates the exemplary electrical machine 1 of FIG. 1 in an electronic circuit diagram. The field-circuit transformer 2 of the electrical machine 1 is formed with a three-phase stator field winding 8 and a corresponding rotor field winding 9. In the present exemplary embodiment, the stator field winding 3 includes three star-connected coils of the stator field winding 8. It is also possible to equip the electrical machine 1 with a stator field winding 8 with more than three phases. In addition, provision can be made for the coils to be arranged in delta-connected fashion instead of star-connected fashion.

Furthermore, the coils of the rotor field winding 9 can be coupled in the form of a transformer to those of the stator field winding 8, with the result that an alternating current is induced in the rotor field winding 8. The resultant three-phase alternating current is supplied to the diode bridge rectifier 10, which has six rectifier diodes 14, which are connected to one another in a known manner. In the case of more than three phases, two further rectifier diodes are provided for each further phase in order to permit, in a known manner, a positive half-cycle of the current to pass through on one of the output lines and a negative half-cycle of the current to pass through on another of the output lines.

The field-circuit transformer 7 can be operated by suitable driving of the primary-side stator field winding 8, with the result that a corresponding alternating current is induced in the rotor field winding 9. The driving of the coils of the stator field winding 8 can take place in such a way that, for example, a current only ever flows simultaneously in some of the coils of the rotor field winding 9, with the result that a corresponding current is induced on the secondary side only in, in each case, two of the coils of the rotor field winding 9.

Furthermore, the output of the diode bridge rectifier 10 can provide the field winding 6 with a virtually constant field current $I_{DC}$. The field winding 6 can serve the purpose of providing a direct magnetic field. The field current $I_{DC}$ can therefore be generated from the alternating current generated in the rotor field winding 9 by virtue of the transformer, by rectification in the diode bridge rectifier 10.

Furthermore, FIG. 2 shows an exemplary transformer control unit 20, which drives pull-up switches 21 and pull-down switches 21 (for example field effect transistors) of an inverter output stage 22, which is supplied with a DC voltage source ($V_{DD}$, $V_{GND}$) in such a way that, for example, a pull-up switch 21 and a pull-down switch 21 are always closed, and therefore define a current path through some of the coils of the stator field winding 8 (in the present example through two of the coils of the stator field winding 8).

Instead of the inverter output stage, an AC thyristor actuating element can also be provided, in which each phase of a polyphase alternating current terminal is connected to one of the phase terminals of the stator field winding 8 via a thyristor switching unit. By virtue of switching of the thyristor switching unit, controlled by the transformer control unit 20, the individual phases can be switched on or off for providing a secondary-side current.

A current measuring element 23, for example in the form of a measuring resistor (for example shunt resistor) can be arranged at least one of the phase terminals of the stator field winding 8 in order to measure a phase current profile. When using the measuring resistor, a measurement voltage which is proportional to the current to be measured can be provided, the measurement voltage being detected in a current detection unit 24. Data on the phase current profile, which data can be derived from the measurement voltage, can be provided either in digital or analog form to a maximum current determination unit 25.

The maximum current determination unit 25 can determine a maximum value $I_{peak\_measure}$ of the phase current from the phase current profile (e.g., the maximum of each positive half-cycle of the phase current $I_1$ can be determined). The maximum current determination unit 25 can provide the maximum value $I_{peak\_measure}$ of the phase current $I_1$ to a field current determination unit 27.

Alternatively, the phase currents of a plurality of, or all of, the phases can be detected. The resultant measurement currents or measurement voltages can then be rectified, for example with the aid of a primary-side bridge rectifier. The rectified measurement current is detected in the current detection unit 24, with the result that the maximum of the resultant rectified measurement current can be determined as the maximum value $I_{peak\_measure}$ in the maximum current determination unit 25.

The field current determination unit 27 can determine the field current $I_{DC}$ from the maximum value $I_{peak\_measure}$ of the phase current $I_1$ in accordance with, for example, the calculation method described below, and provide data on the field current $I_{DC}$ to a motor control unit 26. The motor control unit 26 can drive the transformer control unit 20, which operates the inverter output stage 22, depending on the field current $I_{DC}$ determined, for example in order to keep the field current $I_{DC}$ constant, for example with the aid of suitable regulation, or to set the field current $I_{DC}$ corresponding to a setpoint input.

Figure 3:
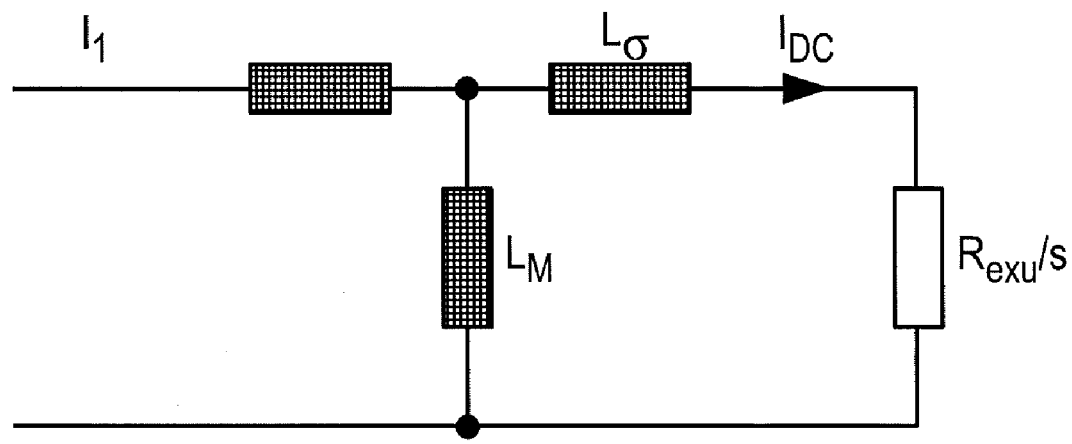
FIG. 3 shows an equivalent circuit diagram for the exemplary field-circuit transformer.

FIG. 3 illustrates an exemplary equivalent circuit diagram of the coupling between one of the coils of the stator field winding 8 and one of the coils of the rotor field winding 9 in an equivalent circuit diagram. That is to say that the equivalent circuit diagram shown in FIG. 3 applies to the transformer coupling between the stator field winding 8 and the rotor field winding 9 if a determined phase current $I_1$ is flowing. The impedance of the field winding 6 is in this case $R_{exu}/s$, where s corresponds to the slip of the rotor 4. The slip s can be determined as follows:

$$s = \frac{f_{supply} - n \cdot p}{f_{supply}},$$

where $f_{supply}$ corresponds to the frequency of the stator-side phase current;
p corresponds to the number of pole pairs of the field-circuit transformer 9; and
n corresponds to the rotation speed in revolutions per second.

The exemplary electrical equivalent circuit diagram in FIG. 3 applies for the response of the field-circuit transformer 7 for a steady-state three-phase model. The equivalent circuit diagram has the magnetizing inductance $L_M$ as essential inductance. A low-level signal equivalent circuit diagram is used for the current estimation carried out in the field current determination unit 27. Since only two phases in the diode bridge rectifier 10 are active at any specific point in time according to an exemplary embodiment, only the active rectifier bridges (i.e., only the active diodes) are taken into consideration, with the result that it is not necessary to calculate the phase shift.

Figure 4:
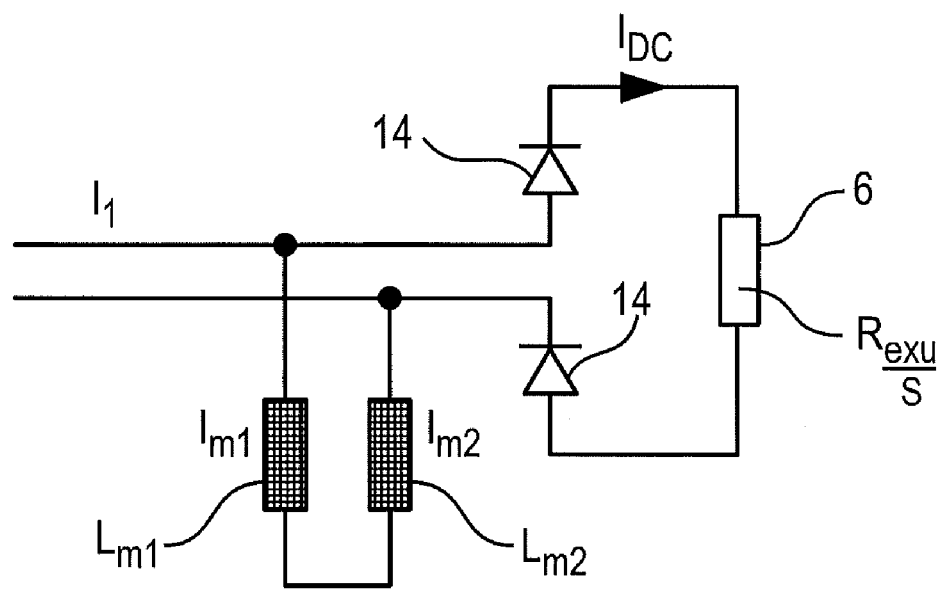
FIG. 4 shows an equivalent circuit diagram for an exemplary active circuit in the rotor.

It can be seen from the exemplary equivalent circuit diagram in FIG. 4 that only the magnetizing inductances $L_M$ of the coils of the rotor field winding 9 are taken into consideration in the low-level signal equivalent circuit diagram, and that the rotor stray inductance $L_\pi$ of the field-circuit transformer 7 does not need to be taken into consideration.

In the equivalent circuit diagram shown in FIG. 4, the following relationship results using the current divider:

$$I_{DC,estimation} = r_{ex} \cdot k \cdot I_{peak_{measure}} \cdot \frac{Z_1}{Z_2},$$

with $$Z_1 = 2 \cdot \omega L \text{ and } Z_2 = \frac{R_{exu}}{S} + Z_1,$$

where
$L = L_{m1} = L_{m2}$ corresponds to the magnetizing inductances of the field-circuit transformer 7, $I_{peak\_measure}$ corresponds to the maximum value of the primary-side phase current $I_1$, k corresponds to a correction factor, which can be predetermined or fixed empirically and can be fixed, for example, to a value of 1.1, and $r_{ex}$ corresponds to a reduction factor of the field-circuit transformer 7 (from stator to rotor), which can be determined with the aid of the turns ratio of the coils of the stator field winding 8 with respect to the coils of the rotor field winding 9.

The field impedance $R_{exu}$ can be determined as follows:

$$R_{exu} = r_{ma}^2 \cdot R_f \cdot r_{ex}^2 \cdot 3 \cdot \frac{U_{rated}}{\sqrt{3} \cdot I_{rated}},$$

where $R_f$ corresponds to the nonreactive resistance of the field winding 6 per unit (i.e., no units), $r_{ma}$ (from rotor to stator) corresponds to a reduction factor, which results from the turns ratio of the coils of the field winding 6 with respect to the coils of the stator winding 3, $U_{rated}$ corresponds to the rated voltage of the electrical machine, and $I_{rated}$ corresponds to the rated current of the electrical machine (corresponding to the data sheet).

The field current $I_{DC}$ in accordance with the above relationship can be calculated as:

$$I_{DC,estimation} = K \cdot I_{peak_{measure}} \cdot J(n),$$

where K represents a constant, which can be determined by computation when using a physical model as a basis or can be determined empirically, and otherwise the impedance ratio J(n), which is dependent on the rotation speed (over the slip s), can likewise be determined easily. In the case of low rotation speeds n, the impedance ratio can under some circumstances even be assumed to be constant.

A functional dependence of the field current $I_{DC}$ on the maximum value of the primary-side phase current and the rotation speed can result as follows:

$$I_{DC} = f(I_{peak_{measure}}, n).$$

Such a functional dependence can be implemented in a simple manner in the field current determination unit 27. In an exemplary embodiment, the calculation of the field current only takes place corresponding to the rate of occurrence predetermined by the frequency of the supply, since maxima in the phase current profiles only occur once during an oscillation period. Thus, the demands placed on the computation power for the field current determination unit 27 can be reduced.

Figure 5:
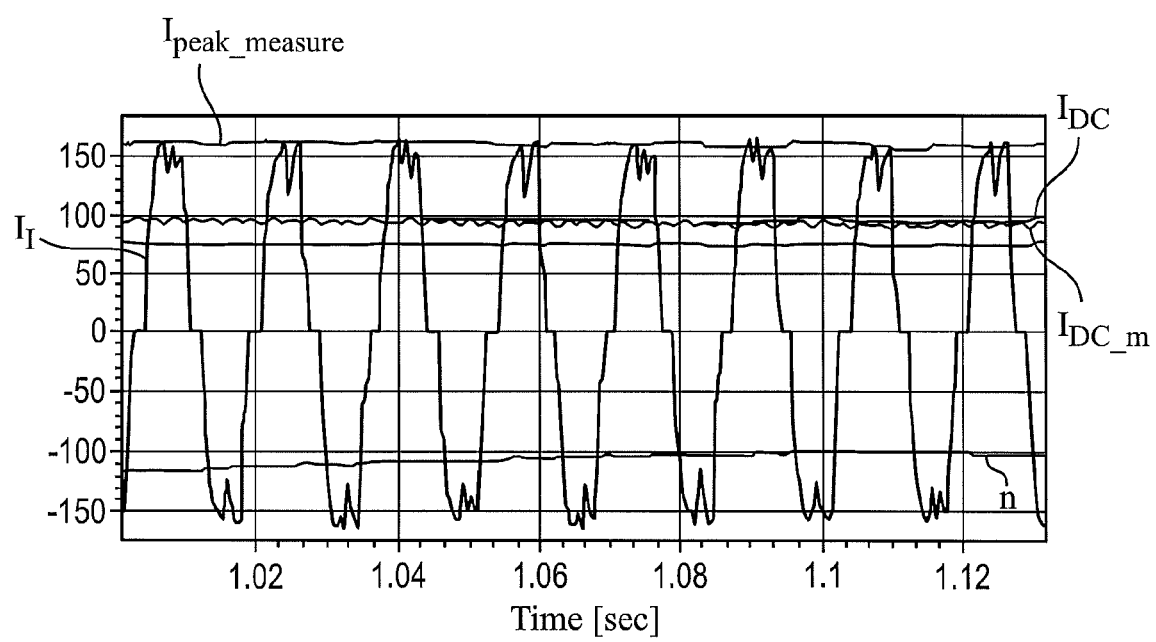
FIG. 5 shows a signal/time graph for illustrating exemplary profiles of a primary-side phase current, rotation speed of the electrical machine, measured field current and calculated field current.

FIG. 5 illustrates exemplary profiles of the primary-side phase current $I_1$, the maximum value $I_{peak\_measure}$ of the primary-side phase current $I_1$, the measured field current $I_{DC\_m}$, the calculated field current $I_{DC}$ and the rotation speed n. It can be seen that the field current $I_{DC}$ can be derived with a high degree of accuracy from the maximum value of the primary-side phase current $I_1$.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Electrical machine
2 Stator
3 Stator winding
4 Rotor
5 Shaft
6 Field winding
7 Field-circuit transformer
8 Stator field winding
9 Rotor field winding
10 Diode bridge rectifier
11 Diode protection circuit
14 Rectifier diode
20 Transformer control unit
21 Pull-up switch or pull-down switch
22 Inverter output stage
23 Current measurement element
24 Current detection unit
25 Maximum current determination unit
26 Motor control unit
27 Field current determination unit

What is claimed is:

1. A method for determining a field current through a field winding in an electrical machine with a stator and a rotor, where the electrical machine has a field-circuit transformer to produce, by induction of an electrical current on a rotor side, field current with which the field winding is energized to generate an excitation magnetic field, the method comprising:
   driving a primary of the field-circuit transformer to produce a field current in the rotor which is derived from current induced on a secondary of the field-circuit transformer;
   measuring at least one phase current in at least one primary-side phase of the field-circuit transformer;
   determining a maximum value of the at least one measured phase current; and
   determining the field current through the field winding based on the maximum value determined.

2. The method as claimed in claim 1, wherein the field current is determined based on:
   a reduction factor of the field-circuit transformer, which is based on a turns ratio of a primary-side stator field winding and a secondary-side rotor field winding;
   a predetermined correction factor; and
   a ratio of a magnetizing inductance of the field-circuit transformer and a sum of the magnetizing inductance and an impedance of the field winding.

3. The method as claimed in claim 1, comprising:
   measuring plural phase currents in plural primary-side phases; and
   determining the maximum value by averaging respective maximum values of the plural phase currents.

4. The method as claimed in claim 1, comprising:
   measuring plural phase currents in plural primary-side phases; and
   determining the maximum value by rectifying currents and voltages, derived from the plural phase currents in a bridge rectifier, and by determining the maximum value based on the rectified currents and the rectified voltages.

5. The method as claimed in claim 2, comprising:
   measuring plural phase currents in plural primary-side phases; and determining the maximum value by averaging respective maximum values of the plural phase currents.

6. The method as claimed in claim 5, comprising:
determining the maximum value by rectifying currents and voltages derived from the plural phase currents in a bridge rectifier, and by determining the maximum value based on the rectified currents and the rectified voltages.

7. An apparatus for determining a field current through a field winding in an electrical machine having a stator, a rotor, and a field-circuit transformer for producing, by induction of an electrical current on a rotor side, the field current with which the field winding is energized to generate an excitation magnetic field, the apparatus comprising:
a device for driving a primary of a field-circuit transformer to produce a field current in a rotor which is derived from current induced on a secondary of the field-circuit transformer;
a current detection unit for measuring at least one phase current in at least one primary-side phase of the field-circuit transformer;
a maximum current determination unit for determining a maximum value of the at least one measured phase current; and
a motor control unit for determining the field current through the field winding based on the maximum value determined.

8. The apparatus as claimed in claim 7, comprising:
a transformer control unit for driving the primary of the field-circuit transformer, the transformer control unit setting rms phase currents to be at least one of:
constant, and prescribed by the motor control unit.

9. A motor system, comprising
an electrical machine with a stator, and a rotor which has a field winding;
a field-circuit transformer for producing by induction of an electrical current on a rotor side, field current ($I_{DC}$) with which a field winding generates an excitation magnetic field;
a device for driving a primary of the field-circuit transformer to produce the field current in the rotor which is derived from current induced on a secondary of the field-circuit transformer;
a current detection unit for measuring at least one phase current in at least one primary-side phase of the field-circuit transformer;
a maximum current determination unit for determining a maximum value of the at least measured phase current; and
a motor control unit for determining the field current through the field winding based on the maximum value determined.

10. The motor system as claimed in claim 9, comprising:
a diode bridge rectifier for rectifying transformer current generated on the secondary of the field-circuit transformer.

* * * * *